UNITED STATES PATENT OFFICE.

PAUL R. WELCH, OF WESTFIELD, NEW YORK, ASSIGNOR TO THE WELCH GRAPE JUICE COMPANY, OF WESTFIELD, NEW YORK, A CORPORATION OF NEW YORK.

METHOD OF TREATING GRAPES.

14,636. Specification of Reissued Letters Patent. Reissued Apr. 15, 1919.

No Drawing. Original No. 1,258,627, dated March 5, 1918, Serial No. 184,470, filed August 4, 1917. Application for reissue filed February 18, 1919. Serial No. 277,877.

*To all whom it may concern:*

Be it known that I, PAUL R. WELCH, a citizen of the United States of America, and resident of Westfield, in the county of Chautauqua, in the State of New York, have invented a new and novel Method of Treating Grapes, of which the following is a full, clear, and exact description.

This invention relates to a new and novel method of treating grapes.

The primary object of the invention is to produce an efficient, economical and improved method of treating grapes in the manufacture of grape products and the recovery of the residual or by-products of grapes. Reference is hereby made to my copending divisional application Serial No. 187,537, filed Aug. 22nd, 1917, and which I am about to abandon in favor of this application.

The present or usual method of treating grapes in the manufacture of grape products comprises the crushing or stemming of the grapes in any suitable manner. The crushed grapes are usually heated to give color and body to the expressed juice, when the ultimate separation of the juice from the other grape material is contemplated.

Such heating is however some times omitted, particularly in treating grapes in the manufacture of white grape juice and is not, therefore, essential to this process.

The crushed grapes, either heated or unheated are then pressed in the usual hydraulic wine or cider press, whereby the juice is separated from the pomace. Under present conditions, this pomace contains the seeds and comprises approximately 50% of moisture, and has usually been thrown away or, at best, used as a fertilizer.

The juice so expressed is then sterilized or preserved in any suitable manner and stored in containers, usually of glass.

After several months of storage, the excess argol (lees) or potassium bi-tartrate separates from the juice and precipitates partly in the form of small crystals and partly in the form of a fine sand or mud.

This precipitate is a valuable by-product and can be sold for cream of tartar manufacture, etc., the grape juice being drawn or pumped off and bottled.

This process has many disadvantages over the process which I am about to describe. The following may be noted.

1. The necessity of using powerful and expensive equipment in the initial operation of expressing the juice from the grapes as for instance, presses of the hydraulic type.

2. The inability of recovering the maximum amount of argol, due in part to the loss of that portion of the same included in and remaining in the pomace cake.

3. The difficulty of completely separating argol in the form of fine sand or mud from the grape juice.

4. The practical impossibility of utilizing the usual hydraulic presses, except in connection with grapes retaining a substantial body, and therefore, before the seeds are removed from the grapes.

5. The practical impossibility of separating the grape seeds from the pomace cake, whereby the former may be utilized to produce other valuable by-products such as grape-seed oil and grape-seed meal.

6. The fact that the pomace cake contains the seeds materially affects its availability for the manufacture of products I have in mind, viz:—grape jam and grape butter.

Other disadvantages may appear from the following description:

The novel process of this application eliminates the above disadvantages and preferably consist of the following steps:—

1. The stemmed or unstemmed grapes, either heated or unheated are fed into a continuous pulping machine by means of which the seeds and stems (if unstemmed grapes are used) are separated from the remaining grape material.

The stems contain a material and valuable amount of potash and preferably separated from the grapes as the first step in the operation.

A portion of the grape skins remains with the seeds and ordinarily another portion is separated with the composite body comprising the pulp and juice, the relative distribution depending largely upon whether the grapes are heated or unheated, and the kind of pulping machine used.

If unheated the skins largely remain with the seeds. If heated a larger proportion of the grape skins is embodied with the composite body comprising the pulp and juice.

2. The composite body comprising pulp and juice may then be sterilized or otherwise preserved and stored in containers which may be glass, stone jugs, barrels and the like.

I do not desire to limit myself to the sterilization or the preservation of the pulp and juice as essential to the invention or as accomplished in any particular way when effected in the preferable manner of carrying out the method herein, as such step may be omitted, the composite body comprising the pulp, juice and argol being stored as it comes from the pulping machine in tanks, etc., under refrigeration, or carbonic acid gas treatment.

3. The composite body comprising the pulp, juice and argol is allowed to stand for a period of several months, which period may be shortened by cold treatment. During this period the argol or potassium bitartrate will form in definite crystals quite uniformly distributed throughout the entire composite body, such crystals, as shown in my experiments, being of material size and granular in form.

4. These crystals and also argol heretofore lost in the pomace may be recovered in any suitable manner, as by a screening machine such as a sugar type centrifugal equipped with proper size mesh screen, the pulp and juice being thrown out and the argol crystals retained.

The steps so far described constitute the process so far as the recovery of argol and the production of a composite body of pulp and juice is concerned and where it is desired to utilize the composite body of pulp and juice, without separation of the juice from the pulp in the manufacture of grape products such as fruit jams, fruit marmalades or fruit butters, the process may be considered as terminated and within the scope of certain of the claims hereto appended, or—

5. The combined grape juice and pulp may then be subjected to pressure in a filter press which will deliver the juice for bottling and discharge the pulp in a cake containing a minimum amount of moisture. This moisture content under proper conditions will be less than that contained in the pomace cake produced in the process heretofore used.

This pulp or pomace cake contains a valuable quantity of protein, nitrogen-free extract, sugars, carbohydrates, etc., and may be dried and used as a stock food, or used in combination with entire grape pulp (that is a composite body of pulp and juice) or other fruit juices or pulps in the manufacture of a fruit jam or a fruit butter. The latter processes and products as distinguised from the method of treating grapes herein described and claimed, together with the process of producing grape seed oil may form the subject matter of other applications, and reference is hereby made to Letters Patent No. 1,277,672 issued to me Sept. 3rd, 1918.

Although I have described a process comprising a specific series of steps and definite methods of effecting each step, all as perhaps preferable in carrying out my invention, I do not desire to limit myself to the same, as many changes, substitutions and omissions may be made in each and all of the same without departing from the spirit of this invention, or the scope of the claims hereto appended.

What I claim is:

1. The method of treating grapes comprising separating the seeds from the pulp and juice, storing the pulp and juice until the argol crystallizes, separating the crystallized argol from the pulp and juice, and then separating the juice from the pulp.

2. The method of treating grapes consisting in heating the grapes, introducing the heated grapes into a pulping machine whereby the seeds are separated from the pulp and juice, storing the pulp and juice until the argol crystallizes, separating the crystallized argol from the pulp and juice, and then separating the juice from the pulp.

3. The method of treating grapes comprising separating the seeds from the pulp and juice, sterilizing the pulp and juice, storing the pulp and juice until the argol crystallizes, separating the crystallized argol from the pulp and juice, and then separating the juice from the pulp.

4. The method of treating grapes consisting in heating the grapes, introducing the heated grapes into a pulping machine whereby the seeds are separated from the pulp and juice, sterilizing the pulp and juice, storing the pulp and juice until the argol crystallizes, separating the crystallized argol from the pulp and juice, and then separating the juice from the pulp.

5. The method of treating grapes comprising separating the seeds from the pulp and juice, storing the pulp and juice until the argol crystallizes, screening the crystallized argol from the pulp and juice, and then separating the juice from the pulp.

6. The method of treating grapes comprising separating the seeds from the pulp and juice, sterilizing the pulp and juice, storing the pulp and juice until the argol crystallizes, separating the crystallized argol from the pulp and juice, and then separating the juice from the pulp.

7. The method of treating grapes comprising separating the stems and seeds and skins from the pulp and the juice, storing the pulp and juice until the argol crystallizes, separating the crystallized argol from the pulp and juice, and then separating the juice from the pulp.

8. The method of treating grapes comprising segregating the pulp and juice, separating excess argol from the pulp and juice, and then separating the juice from the pulp.

9. The method of treating grapes comprising the formation of a composite body of grape material, the crystallization of the argol in definite crystals throughout said composite body, and the separation of the juice from the composite body.

10. The method of treating grapes comprising the formation of a composite body of grape material, the crystallization of the argol in definite crystals throughout said composite body, separating the crystallized argol from the composite body, and then separating the juice from the other grape material comprising the composite body.

11. The method of treating grapes comprising the formation of a composite body of grape material of consistency sufficient to effect the formation by crystallization of a substantially uniform distribution of definite argol crystals throughout the entire composite body, permitting the formation of such argol crystals, and separating the grape juice from the composite body and the crystallized argol.

12. The method of treating grapes comprising the formation of a composite body of grape material of consistency sufficient to effect the formation by crystallization of a substantially uniform distribution of definite argol crystals throughout the entire composite body, permitting the formation of such argol crystals, separating the crystallization argol from the composite body, and then separating the juice from the other grape material comprising the composite body.

13. The method of treating grapes comprising the crystallization of the argol in a composite body of grape material including pulp and juice, and separating the argol from the pulp and juice.

14. The method of treating grapes comprising the crystallization of the argol in a composite body of grape material including pulp and juice and of a consistency sufficient to effect a substantially uniform distribution of definite crystals throughout the composite body, and separating the crystallized argol from the pulp and juice.

15. The method of treating grapes comprising separating the grape seeds from the grape pulp and grape juice, storing the composite body of pulp and juice until the argol crystallizes and separating the crystallized argol from the pulp and juice.

16. The method of treating grapes comprising separating the grape seeds from the grape pulp and grape juice, storing the composite body of pulp and juice until the argol forms in definite crystals throughout the composite body, and separating the crystallized argol from the pulp and juice.

17. The method of treating grapes comprising separation of the grape seeds from the grape pulp and grape juice, sterilizing the composite body of pulp and juice, permitting the argol to form in definite crystals throughout such body, and separating the crystallized argol from the pulp and juice.

18. The method of treating grapes consisting in reducing the grapes to a pulpy mass, the composite body of pulp and juice being of a consistency sufficient to effect a substantially uniform distribution of definite argol crystals throughout the body, permitting argol to form in such definite crystals, and separating the crystallized argol from the pulp and juice.

19. The method of treating grapes comprising the crystallization of the argol in a composite body of grape material including pulp and juice, and screening the definite argol crystals from the pulp and juice.

20. The method of treating grapes comprising separating the grape seeds from the grape pulp and grape juice, storing the composite body of pulp and juice until the argol crystallizes, and screening the definite argol crystals from the pulp and juice.

21. The method of treating grapes consisting in reducing the grapes to a pulpy mass, the composite body of pulp and juice being of a consistency sufficient to effect a substantially uniform distribution of definite argol crystals throughout the body, permitting the argol to form in such definite crystals, and screening the definite argol crystals from the pulp and juice.

22. The method of treating grapes comprising the crystallization of argol in a composite body of grape material including pulp and juice, and separating the crystallized argol from the pulp and juice.

PAUL R. WELCH.

Witnesses:
A. P. Oakes,
F. G. Sparks.